Patented Feb. 22, 1949

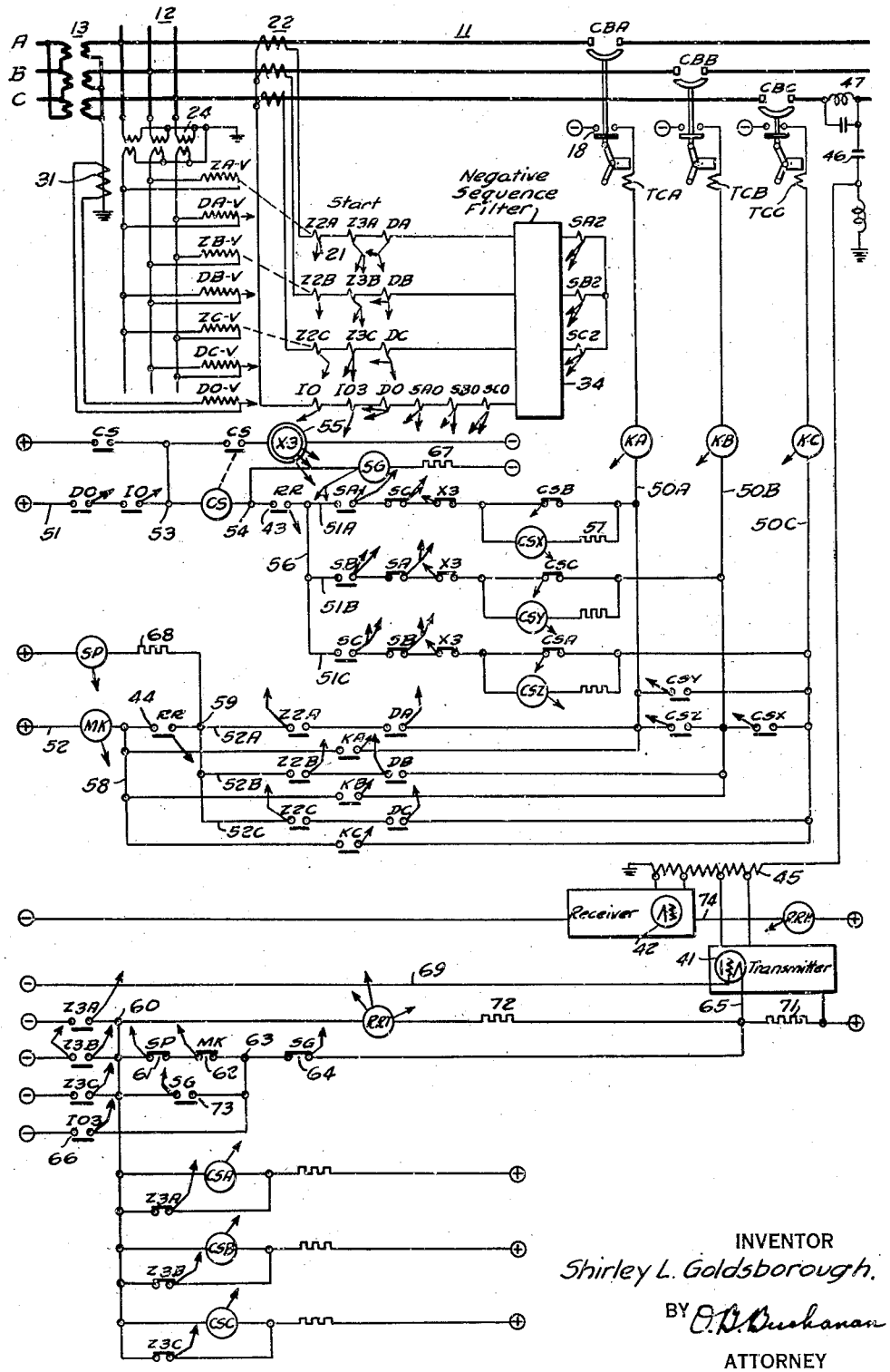

2,462,179

UNITED STATES PATENT OFFICE 2,462,179

PROTECTIVE RELAYING SYSTEM FOR POLYPHASE CIRCUITS

Shirley L. Goldsborough, Basking Ridge, N. J., assignor to Westinghouse Electric Corporation, East Pittsburgh, Pa., a corporation of Pennsylvania Application December 21, 1944, Serial No. 569,181

15 Claims. (Cl. 175—294)

1

My invention relates to improvements in the selective-pole tripping-system which is shown and claimed in my Patent No. 2,320,861, granted June 1, 1943. In the patented system, a single pole of the circuit-breakers was opened in the event of a single line-to-ground fault on a three-phase transmission-line, so that power could be transmitted over the two remaining line-conductors during the interval while the single-phase ground-fault was being cleared. However, when a fault occurred, involving two phase-conductors, all of the poles of the circuit-breakers were tripped, or else a special phase-selector was required, using a response to quantities other than the preferred directional comparison of negative-sequence and zero-sequence components, in the relaying system as shown in the aforementioned patent.

It is an object of my present invention to trip only as many poles of the circuit-breakers as may be necessary, in order to clear a fault involving two phase-conductors of the line. In case of an ungrounded two-phase fault, the fault will be cleared by the opening of either pole of the two faulted phases, and if only one of these poles is opened, the other two line-conductors remain intact, for transmitting important amounts of synchronizing power over the line while the fault is being cleared. If a two-phase fault involves ground, both poles of the two faulted phases will have to be opened, in order to clear the fault, and if only these two necessary circuit-breaker poles are opened, then there will remain a single line-conductor intact, which, because of the neutral grounding of the power-transformers, will transmit a small, yet still important, amount of power over the transmission-line during the time-interval necessary for clearing the double-line-to-ground fault.

The objects of my invention are to provide means broadly for accomplishing the purposes just stated, and also to provide various practical specific relays and connections for bringing about the desired results in a preferred manner.

In the accompanying drawing, the single figure is a diagrammatic view of circuits and apparatus embodying my invention in a preferred form of embodiment.

The various relays which make up my tripping-system include various line-responsive relays, the various coils and contacts of which are separated into alternating-current circuits and direct-current circuits, respectively, the various circuits being arranged, so far as practicable, after the matter of a schematic diagram or "across-the-line" diagram. In each case, the main or operating coil of the relay is given a letter-designation or legend, and the same letter-designation or legend is applied to all of the contacts of that relay. The relays and switches are invariably shown in their open or deenergized positions. When a given relay has, in addition to its main or operating winding, an auxiliary winding, such as a voltage-responsive restraining or polarizing coil or winding, the auxiliary winding is given the same letter-designation, with a subscript. Arrows or dotted lines are used, to symbolically indicate how the various parts of each relay are connected together. When corresponding elements are utilized in different phases, they are distinguished by suffixes, such as A, B and C, for the different phases.

I have illustrated my invention as being applied to the protection of a three-phase transmission-line 11 which is connected to a bus 12 to which power is supplied from a three-phase power-source A, B, C through a step-up delta-star power-transformer 13. The three phase-conductors of the protected line 11 are provided with separate individual single-pole circuit-breakers CBA, CBB and CBC, respectively, which are provided with trip-coils TCA, TCB and TCC. Each circuit-breaker is provided with auxiliary contacts of various kinds, including a make-contact 18.

The line 11 is protected against phase-faults, or faults involving different pairs of line-conductors, or, in general, more than one line-conductor, by means of second and third-zone impedance-relays Z2 and Z3, for each of the phases, which are distinguished by the added letters A, B and C respectively. The impedance-relays have current-responsive operating-coils 21 which are energized from a set of star-connected line-current transformers 22, and voltage-responsive restraining-coils ZA—V, ZB—V and ZC—V, which are energized from potential-transformers 24 connected to the bus 12. The second-zone impedance-relays Z2 are each provided with a single make-contact, which is sufficiently identified by designating the relay of which it is a part. The third-zone impedance-relays each have one make-contact and one back-contact, both of which are sufficiently identified by the relay-designation.

The phase-fault impedance-relays for the various phases are associated with directional elements DA, DB and DC respectively.

Ground-fault protection is provided by various means, including a conventional residual-current or zero-phase-sequence relay IO, a more sensitive residual-current fault-detector IO3, and a ground directional relay DO, each having a single make-contact which is conveniently identifiable by reference to the symbol for the relay of which it is a part. The current-coils of these three relays are energized in the neutral conductor of the line-current transformers 22, so as to be responsive to the zero-sequence current-component, thus making it possible to adjust the relays to respond to ground-fault currents which are less than the rated load-current of the line, as is common practice in residual-current ground-fault relays. The polarizing coil DO—V of the ground directional relay DO may be energized in any one of different ways which are known to the art, the particular system which is illustrated in the drawing utilizing current-polarization which is obtained from an auxiliary current-transformer 31 in the grounded neutral of the power-transformer 13.

As shown in my above-mentioned patent, I also provide three ground-fault phase-selector relays SA, SB and SC, which are sensitive single-phase directional relays, each having two coils which may be designated as zero-sequence field-coils SAO, SBO and SCO, respectively, which are energized in the neutral conductor of the line-current transformers 22, and negative-sequence polarizing coils SA2, SB2 and SC2, respectively, which are energized from the three output-phases of a three-phase negative-sequence filter 34.

I also utilize a carrier-current transmitter which is symbolically represented by a rectangle and a triode oscillator-valve 41; also a carrier-current receiver which is symbolically represented by a rectangle and a triode receiver-tube 42; also a polarized receiver-relay RR, having an actuating or trip-coil RRT and a restraining or holding-coil RRH. The receiver-relay RR has two make-contacts 43 and 44 which are utilized in the ground-fault and phase-fault tripping-circuits, respectively, as will be subsequently described.

The carrier-current transmitter and receiver are coupled to the phase-C conductor of the line 11, through a transformer 45 and a coupling-capacitor 46, and the carrier-current is kept out of the bus 12, so that it is confined to the phase-C conductor of the line 11, by means of a wave-trap 47, as is usual.

It will be understood that similar equipment is provided at the other end of the protected line-section 11.

The circuits for energizing and controlling the respective trip-coils TCA, TCB and TCC, of the three single-pole breakers will now be described, and since the circuits are all alike except for the letters A, B and C designating the respective phases, the immediately following explanation will be applied more directly to the phase-A circuit-breaker CBA and its control-circuits, with the understanding that the other two circuit-breakers are similarly controlled by corresponding relays in their respective phases.

The TCA trip-coil is energized from the negative bus (—) through the auxiliary breaker-contact 18 and the coil of a phase-A contactor KA, from a tripping-bus 50A which is adapted to be connected to the positive bus (+) through various relaying circuits. The tripping-bus 50A is adapted to be energized, from the positive bus, either through a phase-A ground-fault circuit 51A, or a phase-A phase-fault circuit 52A.

The ground-fault branch 51A of the circuit which connects the tripping-bus 50A to the positive bus includes a common circuit 51 which is common to all three of the ground-fault tripping-circuits 51A, 51B, and 51C. It is traceable from the positive bus (+) through the DO contact and the IO contact to a circuit-conductor 53, and thence through the operating coil of a contactor-switch CS, to a circuit-conductor 54. This contactor-switch CS is common to all three of the ground-fault tripping-circuits 51A, 51B and 51C. It has two make-contacts CS, one of which bypasses the DO and IO contacts, while the other energizes the operating-coil of a slugged, or slow-dropout relay X3. This relay X3 is provided with a slugged or short-circuited coil or washer 55, which gives it a delay of about ½ second in its dropout operation, as described in my above-mentioned patent.

The common ground-fault tripping-circuit 51 continues, from the conductor 54, through the RR contact 43 of the receiver-relay, and thence to a circuit-conductor 56. Here, the ground-fault tripping-circuits branch off, into the three individual circuits 51A, 51B and 51C, the first of which will be traced.

From the conductor 56, the phase-A ground-fault tripping-branch 51A continues through the SA make-contact of the phase-A selector-relay SA, and thence to the SC back-contact of the next leading phase-selector relay SC, and thence through the X3 back-contact, and finally through the back-contact CSB of an auxiliary relay or contactor-switch CSB of the next lagging phase, and thence to the phase-A tripping-circuit 50A of the phase-A circuit-breaker CBA.

The three contactor-switches CSA, CSB and CSC are responsive to the third-zone impedance-elements Z3A, Z3B and Z3C, respectively. Thus, as shown at the bottom of the drawing, the coil of each contactor-switch CSA, CSB or CSC is shunted by the back-contact of the corresponding third-zone element Z3A, Z3B or Z3C, so as to be energized when its third-zone element responds.

In the phase-A ground-fault tripping-circuit 51A the CSB contact is shunted by the operating-coil CSX of a phase-A contactor-switch, which is of the voltage-responsive type, its coil having many turns of high resistance, which is symbolized by the resistance 57. The corresponding phase-B and phase-C contactor-switches are designated CSY and CSZ, respectively. The CSX make-contact of the phase-A relay joins the tripping-circuits 50B and 50C of the two other phases, and similarly for the CSY and CSZ make-contacts.

The phase-fault branch 52A of the circuit which connects the tripping-bus 50A to the positive bus (+) includes a common circuit 52 which is common to all three of the phase-fault tripping-circuits 52A, 52B and 52C. It is traceable from the positive bus (+) through the operating-coil of a common phase-fault master-contactor MK, and thence to a circuit-conductor 58, thence through the make-contact 44 of the receiver-relay RR, to a circuit-conductor 59. Here, the phase-fault tripping-circuit divides into the three branches 52A, 52B and 52C. The phase-A branch 52A includes the second-zone impedance-relay contact Z2A, and the directional-relay contact DA, and joins on to the phase-A tripping-circuit 50A of the phase-A circuit-breaker CBA.

Auxiliary tripping connections are also provided by the three make-contacts KA, KB and KC of the phase-A, phase-B and phase-C contactors KA, KB and KC. These make-contacts KA, KB and KC connect the circuit-conductor 58 to the respective trip-circuits 50A, 50B and 50C.

The carrier-current transmitter and the receiver-relay trip-coil RRT are controlled as explained in my above-mentioned patent. Thus, the make-contacts of the three third-zone impedance relays Z3A, Z3B and Z3C are connected in parallel between the negative bus (—) and a circuit 60 which is utilized to close the cathode-circuit of the transmitter-oscillator 41 through the back-contact 61 of a directionally responsive phase-fault auxiliary relay SP, and the back-contact 62 of the master-contactor MK, to a conductor 63, and thence through the back-contact 64 of a directionally responsive ground-fault auxiliary relay SG, to the cathode-terminal 65 of the transmitter-oscillator 41. This cathode-terminal 65 is the carrier-starting terminal of the transmitter. A second cathode-energizing circuit is completed from the negative bus to the conductor 63 through the make-contact 66 of the sensitive ground-fault carrier-starter relay IO3.

The SG coil is energized from the conductor 54 in the ground-fault tripping-circuit, being connected between said conductor and the negative bus, through a resistor 67 of such magnitude that the trip-coils are not short-circuited and the CS contactor is preferably also not picked up until a ground-fault trip-circuit 51—50 is completed through one of the trip-coils TCA, TCB or TCC.

The SP coil is energized from the common conductor 59 in the phase-fault tripping circuits, being connected between this conductor and the positive bus, through a resistor 68 of such size as to prevent an actuation of any of the trip-coils TCA, TCB or TCC.

The grid-circuit 69 of the transmitter-oscillator 41 is directly connected to the negative bus, as shown, while the cathode-terminal 65 is normally held at the potential of the positive bus by being connected thereto through a resistor 71, so that the transmitter is normally in a non-transmitting condition, and transmits carrier-current only when its cathode-circuit 65 is connected to the negative bus through one of the energizing circuits which have been traced through the SG back-contact 64 and the conductor 63.

The receiver-relay trip-coil RRT is connected, through a resistance 72 between the conductor 60 and the cathode-terminal 65, the resistance 72 being large enough so that the transmitter-oscillator 41 does not oscillate except when an energizing-circuit is made through the SG break-contact 64 and the conductor 63. The two conductors 60 and 63 are also connected through the make-contact 73 of the directionally responsive ground-fault auxiliary relay SG.

The receiver-relay holding-coil RRH is directly energized from the receiver-tube 42, being connected between the anode-terminal 74 thereof and the positive bus.

On single-phase ground-faults, say phase-A for example, the corresponding phase-selector relay SA responds, and energizes the proper ground-fault tripping-circuit 51A—50A, and trips the circuit-breaker CBA in the phase-A line-conductor, as in Figs. 1 and 2 of my above-mentioned patent. At the same time that the phase-A tripping-circuit 50A is energized, energizing the trip-coil TCA as just described, the "instantaneously" operative contactor-switches KA and CS are energized, both closing their contacts within a certain small fraction of a cycle.

The KA contacts complete a "holding" circuit between the circuits 58 and 50A, thus preventing an interruption of the tripping-circuit 50A when the back-contact X3 opens, in the circuit 51A, as a result of, and subsequent to, the closure of the CS contacts in series with the X3 coil. On such a fault, the phase-B third-zone distance-measuring element Z3B does not respond, and hence the back-contacts CSB remain closed, completing the phase-A ground-fault tripping-circuit 51A, and also preventing the energization of the phase-A auxiliary relay CSX.

On ungrounded phase-to-phase faults, say A to B, the phase-fault relay in the leading phase, that is, phase-A, responds, initiating carrier-current transmission through the Z3A make-contacts, and completing the phase-A phase-fault tripping-circuit 52A through RR contact 44, the Z2A contact, and the DA contact. This is in accordance with the ordinary practice, except that such energization is utilized only to energize the phase-A trip-circuit 52A—50A, without energizing the trip-circuits for all three poles of the circuit-breakers CBA, CBB and CBC. None of the auxiliary contactors CSX, CSY or CSZ is energized, and hence no other tripping-circuit 50B or 50C is connected to the phase-A tripping-circuit 50A. The auxiliary contactors CSX, CSY and CSZ are not energized because the overcurrent element IO, having a contact in the ground-fault tripping-circuit 51, is set high enough not to respond to current-transformer errors on phase-faults which do not draw any ground-current, and hence no energy can reach the operating coils of the relays CSX, CSY and CSZ. Under some conditions, the third-zone phase-fault relays Z3A and Z3B may both operate, to energize both CSA and CSB, which, in turn, remove the short-circuits from both CSZ and CSX, but this causes no harm, since the CSZ and CSX energizing-circuits are open at the IO make-contacts.

On two-phase-to-ground faults, say B-to-C-to-ground, the phase-fault relay in the leading faulted phase, in this case phase-B, again energizes the trip-circuit for the circuit-breaker in that phase. Such a circuit is completed through the RR contact 44, and the Z2B contact and DB contact, to the trip-coil TCB of the phase-B circuit-breaker CBB. It is also desired to trip the phase-C circuit-breaker CBC, and my relay-circuit connections accomplish this in the following manner.

It is well known that, on a double phase-to-ground fault, such as a B-to-C-to-ground fault, the phase-selector SA, in the unfaulted phase, always responds. This is because of the relative phase-relationships of the phase-A zero-sequence line-current $I_{0A}$ and the phase-A negative-sequence current $I_{2A}$, as explained in my above-mentioned patent.

Nearly always, the fault-resistance to ground is higher than the phase-to-phase resistance, making the zero-sequence line-current $I_{0A}$ considerably lead the negative-sequence current $I_{2A}$, causing the two phase-selectors SA and SB to respond, on a BC ground-fault. It will be noted that I have placed the SA back-contact in series with the SB make-contact, in the phase-B ground-fault tripping-circuit 51B, thus preventing the SB make-contact from energizing the auxiliary relay CSY, which, if energized, would trip the unfaulted phase-A from the phase-C tripping-circuit. The danger of energizing the CSY operating-coil is real, because the third-zone phase-C impedance-element Z3C responds to a B—C fault, thus opening the back-contact CSC around said operating-coil CSY. On the other hand, I utilize the response of the phase-A selector SA to energize the operating coil CSX, which closes the CSX make-contact between the two trip-circuits 50B and 50C, thus energizing the phase-C tripping-circuit 50C from the phase-B tripping-circuit 50B. The CSX operating-coil has enough resistance, symbolized at 57, to prevent the tripping of the phase-A trip-circuit 50A, so that this phase-A trip-circuit 50A is not effectively energized for tripping purposes, but only enough to energize the CSX operating-coil when the CSB back-contact opens in response to Z3B.

When the two phase-selector relays SA and SB respond, on a BC ground-fault, the phase-B ground-fault tripping-circuit 51B is not energized, in response to a closure of the SB make-contact, because of the presence of the SA back-contact in series therewith, because the SA back-contact opens first, and prevents this phase-B tripping-circuit 51B from becoming energized. Thus I avoid energizing the operating-coil of the CSY relay which, if energized, would energize the phase-A tripping-circuit 50A from the phase-C tripping-circuit 50C.

On the other hand, however, it is possible that occasionally there will be a fault having little or no resistance to ground, making the phase-A zero-sequence line-current $I_{0A}$ lag the phase-A negative-sequence current $I_{2A}$, causing the two phase-selectors SA and SC to operate. In such a case, the phase-B circuit-breaker CBB is tripped on the phase-B phase-fault response, circuit 52B, as already described, and the phase-C circuit-breaker CBC is tripped on the ground-fault response through the SC make-contact in circuit 51C. In this last-mentioned circuit 51C, the CSZ coil is not energized, because the third-zone-element Z3A, in the unfaulted phase, does not respond, and hence the CSA back-contacts remain closed, thus completing the phase-C tripping-circuit 51C—50C, and also preventing the actuation of the CSZ relay, which, if actuated, would energize the phase-A tripping-circuit 50A from the phase-B tripping-circuit 50B.

Thus, I utilize the erroneous operation of the SA phase-selector, on a BC ground-fault, to energize the auxiliary relay CSX when the SC phase-selector does not respond, and the auxiliary relay CSX energizes the phase-C tripping-circuit 50C from the phase-B tripping-circuit 50B which is energized through the action of the phase-fault relays. In case the phase-relationships of the zero-sequence and negative-sequence current-components $I_{0A}$ and $I_{2A}$ are such that the phase-selectors SA and SC respond, rather than SA and SB, I utilize the SC-response to directly energize the phase-C tripping-circuit 50C, without energizing any of the auxiliary-relays CSX, CSY or CSZ.

In the foregoing explanation, the phase-sequence is understood to be A, B, C, so that phase-A leads phase-B, etc.

For the purpose of simplicity and clarity of illustration of the particular novel features of my present invention, I have not complicated the drawing or the explanation with a showing or a discussion of the circuit-breaker reclosure-means, which would ordinarily be utilized, as shown and discussed in my previously mentioned patent.

While I have described my invention in a preferred form of embodiment, I desire it understood that my invention is not limited to the precise form illustrated, and I desire that the accompanying claims shall be accorded the broadest interpretation consistent with their language.

I claim as my invention:

1. Fault-responsive protective relaying means for controlling each of a plurality of single-pole circuit-interrupters in the several phase-conductors of a three-phase line, comprising ground-fault relaying-means for selecting the faulted line-conductor in the event of a predetermined single line-to-ground fault on the line, means responsive to an operation of a ground-fault relaying-means for causing an opening-operation of only the single-pole circuit-interrupter in the selected line-conductor, phase-fault relaying-means for responding to at least one of the two faulted line-conductors in the event of a predetermined fault involving two line-conductors of the line, said ground-fault relaying means being of a type which is likely to erroneously select the unfaulted phase in the event of a double phase-to-ground fault, and auxiliary interrupter-controlling means correlating the responses and non-responses of particular phases of said ground-fault and phase-fault relaying means for causing opening operations of only the two single-pole circuit-interrupters in the two faulted line-conductors involved in the double phase-to-ground fault-condition which caused the response of the phase-fault relaying-means, said auxiliary interrupter-controlling means comprising a means for utilizing a phase-fault response, in one of said two faulted phases, to prevent an erroneous interrupter operation in response to the erroneous ground-fault selection and to complete a connection between the phase-fault selection of said one of the two faulted phases and the interrupter-controlling means for the other faulted phase in the event of a double phase-to-ground fault.

2. Fault-responsive protective relaying means for selectively controlling the energizations of the several trip-circuits of a plurality of single-pole circuit-interrupters in the several phase-conductors of a three-phase line, comprising ground-fault relaying-means for selecting the faulted line-conductor in the event of a predetermined single line-to-ground fault on the line, means responsive to an operation of a ground-fault relaying-means for causing a circuit-making operation in the trip-circuit of only the single-pole circuit-interrupter in the selected line-conductor, phase-fault relaying-means for responding to at least one of the two faulted line-conductors in the event of a predetermined fault involving two line-conductors of the line, said ground-fault relaying means being of a type which is likely to erroneously select the unfaulted phase in the event of a double phase-to-ground fault, and auxiliary interrupter-controlling means correlating the responses and non-responses of particular phases of said ground-fault and phase-fault relaying means for causing effective circuit-making operations in the trip-circuits of only the two single-pole circuit-interrupters in the two faulted line-conductors involved in the double phase-to-ground fault-condition which caused the response of the phase-fault relaying-means, said auxiliary interrupter-controlling means comprising a circuit-breaking blocking-contact of the phase-fault relaying-means in one of said two faulted phases, in series with the circuit-making contact of said erroneously responding ground-fault relaying-means, and an auxiliary relay-means energized in parallel to said blocking-contact for completing a connection between the phase-fault selection of said one of the two faulted phases and the interrupter-controlling means for the other faulted phase in the event of a double phase-to-ground fault.

3. Fault-responsive protective relaying means for controlling each of a plurality of single-pole circuit-interrupters in the several phase-conductors of a three-phase line, comprising ground-fault relaying-means for selecting the faulted line-conductor in the event of a predetermined single line-to-ground fault on the line, means responsive to an operation of a ground-fault relaying-means for causing an opening-operation of only the single-pole circuit-interrupter in the selected line-conductor, phase-fault relaying-means for responding sensitively to at least one of the two faulted line-conductors in the event of a predetermined fault involving two line-conductors of the line and for selecting a predetermined one of said two faulted line-conductors, means responsive to a selective operation of a phase-fault relaying-means for causing an opening-operation of only the single-pole circuit-interrupter in the selected line-conductor, said ground-fault relaying means being of a type which is likely to erroneously select the unfaulted phase in the event of a double phase-to-ground fault, and auxiliary interrupter-controlling means correlating the responses and non-responses of particular phases of said ground-fault and phase-fault relaying means for causing an opening-operation of the single-pole circuit-interrupter in the other one of the two faulted line-conductors in the event of a predetermined ground-fault involving two line-conductors of the line, said auxiliary interrupter-controlling means comprising a means for utilizing a phase-fault response, in one of said two faulted phases, to prevent an erroneous interrupter operation in response to the erroneous ground-fault selection and to complete a connection between the phase-fault selection of said one of the two faulted phases and the interrupter-controlling means for the other faulted phase in the event of a double phase-to-ground fault.

4. Fault-responsive protective relaying means for selectively controlling the energizations of the several trip-circuits of a plurality of single-pole circuit-interrupters in the several phase-conductors of a three-phase line, comprising ground-fault relaying-means for selecting the faulted line-conductor in the event of a predetermined single line-to-ground fault on the line, means responsive to an operation of a ground-fault relaying-means for causing a circuit-making operation in the trip-circuit of only the single-pole circuit-interrupter in the selected line-conductor, phase-fault relaying-means for responding sensitively to at least one of the two faulted line-conductors in the event of a predetermined fault involving two line-conductors of the line and for selecting a predetermined one of said two faulted line-conductors, means responsive to a selective operation of a phase-fault relaying-means for causing a circuit-making operation in the trip-circuit of only the single-pole circuit-interrupter in the selected line-conductor, and means correlating the responses and non-responses of particular phases of said ground-fault and phase-fault relaying means for causing a circuit-making operation for joining the trip-circuits of the two single-pole circuit-interrupters in the two faulted line-conductors in the event of a predetermined ground-fault involving two line-conductors of the line.

5. Fault-responsive protective relaying means for controlling a plurality of single-pole circuit-interrupters in the several phase-conductors of a three-phase line, comprising phase-sequence directionally responsive relay-means for selecting the phase in which the corresponding phase of the negative-sequence line-current component has a predetermined direction relative to the zero-sequence line-current component, said phase-sequence relay-means being subject, under certain conditions, to an erroneous selection of the unfaulted phase in the event of a double phase-to-ground fault, phase-fault relaying-means for selecting at least one of the two faulted line-conductors in the event of a predetermined fault involving two line-conductors of the line, and means responsive to a particular phase-selection by said phase-sequence relay-means and a particular phase-selection of said phase-fault relaying-means for preventing an opening-operation of the single-pole circuit-interrupter in the phase selected by said phase-sequence relay-means, and for causing opening-operations of only the two single-pole circuit-interrupters in the two faulted line-conductors involved in the double phase-to-ground fault-condition which caused the response of the phase-fault relaying-means.

6. Fault-responsive protective relaying means for selectively controlling the energizations of the several trip-circuits of a plurality of single-pole circuit-interrupters in the several phase-conductors of a three-phase line, comprising phase-sequence directionally responsive relay-means for selecting the phase in which the corresponding phase of the negative-sequence line-current component has a predetermined direction relative to the zero-sequence line-current component, means responsive to an operation of said phase-sequence relay-means for causing a circuit-making operation in the triple-circuit of only the single-pole circuit-interrupter in the phase thus selected, phase-fault relaying-means for responding sensitively to at least one of the two faulted line-conductors in the event of a predetermined fault involving two line-conductors of the line and for selecting a predetermined one of said two faulted line-conductors, means responsive to a selective operation of a phase-fault relaying-means for causing a circuit-making operation in the trip-circuit of only the single-pole circuit-interrupter in the phase thus selected, and means jointly responsive to the operation of the phase-fault relaying-means and to the selection of the unfaulted phase by the phase-sequence relay-means for causing a circuit-making operation for joining the trip-circuits of the two single-pole circuit-interrupters in the two faulted line-conductors in the event of a predetermined ground-fault involving two line-conductors of the line.

7. Fault-responsive protective relaying means for controlling a plurality of single-pole circuit-interrupters in the several phase-conductors of a three-phase line, comprising phase-sequence directionally responsive relay-means for selecting the phase in which the corresponding phase of the negative-sequence line-current component has a predetermined direction relative to the zero-sequence line-current component, phase-fault relaying-means for selecting at least one of the two faulted line-conductors in the event of a predetermined fault involving two line-conductors of the line, and means jointly responsive to a selection of a phase by said phase-sequence relay-means and to the non-selection of another predetermined phase by said phase-fault relaying-means for causing an opening-operation of only the single-pole circuit-interrupter in the phase selected by said phase-sequence means.

8. A ground-fault phase-selector apparatus for a three-phase line, comprising three directionally responsive phase-selector elements, each responsive to a predetermined phase-relation between a zero-sequence component of an electrical quantity of the line and its own particular phase of a negative-sequence component of an electrical quantity of the line, phase-fault relaying-means for responding, under certain conditions, to only one of the two faulted conductors in the event of a double phase-to-ground fault, three relaying circuits, each responsive to a response of the phase-selector element of that particular phase, a non-response of the phase-selector element of the next leading phase, and a circuit-breaking blocking-contact of a phase-fault relaying-means in a phase which is responded to in the event of a double phase-to-ground fault, and an auxiliary relay-means energized in parallel to said blocking-contact for effecting an auxiliary fault-responsive relay-circuit operation.

9. A ground-fault phase-selector apparatus for a three-phase line, comprising three directionally responsive phase-selector elements, each responsive to a predetermined phase-relation between the zero-sequence line-current component and its own particular phase of the negative-sequence line-current component, phase-fault relaying-means for responding, under certain conditions, to only one of the two faulted conductors in the event of a double phase-to-ground fault, three relaying circuits, each responsive to a response of the phase-selector element of that particular phase, a non-response of the phase-selector element of the next leading phase, and a circuit-breaking blocking-contact of a phase-fault relaying-means in a phase which is responded to in the event of a double phase-to-ground fault, and an auxiliary relay-means energized in parallel to said blocking-contact for effecting an auxiliary fault-responsive relay-circuit operation.

10. Fault-responsive protective relaying means for selectively controlling the energizations of the several trip-circuits of a plurality of single-pole circuit-interrupters in the several phase-conductors of a three-phase line, comprising three directionally responsive phase-selector elements, each responsive to a predetermined phase-relation between a zero-sequence component of an electrical quantity of the line and its own particular phase of a negative-sequence component of an electrical quantity of the line, phase-fault relaying-means for selecting at least one of the two faulted line-conductors in the event of a predetermined fault involving two line-conductors of the line, and means for severally energizing the several trip-circuits of the single-pole circuit-interrupters, including means jointly responsive to a phase-fault response to a fault involving two line-conductors, a response of the phase-selector element for the unfaulted phase, and a non-response of the phase-selector element of the next leading phase, said jointly responsive means being operable to cause a circuit-making operation for pairing together the trip-circuits of the single-pole circuit-interrupters in the two faulted line-conductors in the event of said predetermined fault.

11. Fault-responsive protective relaying means for selectively controlling the energizations of the several trip-circuits of a plurality of single-pole circuit-interrupters in the several phase-conductors of a three-phase line, comprising three directionally responsive phase-selector elements, each responsive to a predetermined phase-relation between a zero-sequence component of an electrical quantity of the line and its own particular phase of a negative-sequence component of an electrical quantity of the line, phase-fault relaying-means for selecting at least one of the two faulted line-conductors in the event of a predetermined fault involving two line-conductors of the line, and means for causing a circuit-making operation in the trip-circuit of only the single-pole circuit-interrupter in the line-conductor selected by the phase-selector elements in joint response to a response of the operating phase-selector element, a non-response of the phase-selector element of the next leading phase, and a non-response of a phase-fault relaying-means which would have responded if there had been a two-phase fault involving the two line-conductors other than the one selected by the phase-selector elements.

12. Fault-responsive protective relaying means for selectively controlling the energizations of the several trip-circuits of a plurality of single-pole circuit-interrupters in the several phase-conductors of a three-phase line, comprising three directionally responsive phase-selector elements, each responsive to a predetermined phase-relation between a zero-sequence component of an electrical quantity of the line and its own particular phase of a negative-sequence component of an electrical quantity of the line, phase-fault relaying-means for responding sensitively to at least one of the two faulted line-conductors in the event of a predetermined fault involving two line-conductors of the line and for directionally selecting a predetermined one of said two faulted line-conductors, means responsive to a selective operation of a phase-fault relaying-means for causing a circuit-making operation in the trip-circuit of only the single-pole circuit-interrupter in the phase selected by the phase-fault relaying-means, and means for causing a circuit-making operation in the trip-circuit of only the single-pole circuit-interrupter in the line-conductor selected by the phase-selector elements in joint response to a response of an operating phase-selector element, a non-response of the phase-selector element of the next leading phase, and a non-response of the sensitive phase-fault relaying-means for the unfaulted line-conductor.

13. Fault-responsive protective relaying means for selectively controlling the energizations of the several trip-circuits of a plurality of single-pole circuit-interrupters in the several phase-conductors of a three-phase line, comprising three directionally responsive phase-selector elements, each responsive to a predetermined phase-relation between the zero-sequence line-current component and its own particular phase of the negative-sequence line-current component, phase-fault relaying-means for selecting at least one of the two faulted line-conductors in the event of a predetermined fault involving two line-conductors of the line, and means for severally energizing the several trip-circuits of the single-pole circuit-interrupters, including means jointly responsive to a phase-fault response to a fault involving two line-conductors, a response of the phase-selector element for the unfaulted phase, and a non-response of the phase-selector element of the next leading phase, said jointly responsive means being operable to cause a circuit-making operation for pairing together the trip-circuits of the single-pole circuit-interrupters in the two faulted line-conductors in the event of said predetermined fault.

14. Fault-responsive protective relaying means for selectively controlling the energizations of the several trip-circuits of a plurality of single-pole circuit-interrupters in the several phase-conductors of a three-phase line, comprising three directionally responsive phase-selector elements, each responsive to a predetermined phase-relation between the zero-sequence line-current component and its own particular phase of the negative-sequence line-current component, phase-fault relaying-means for selecting at least one of the two faulted line-conductors in the event of a predetermined fault involving two line-conductors of the line, and means for causing a circuit-making operation in the trip-circuit of only the single-pole circuit-interrupter in the line-conductor selected by the phase-selector elements in joint response to a response of the operating phase—selector element, a non-response of the phase-selector element of the next leading phase, and a non-response of a phase-fault relaying-means which would have responded if there had been a two-phase fault involving the two line-conductors other than the one selected by the phase-selector elements.

15. Fault-responsive protective relaying means for selectively controlling the energizations of the several trip-circuits of a plurality of single-pole circuit-interrupters in the several phase-conductors of a three-phase line, comprising three directionally responsive phase-selector elements, each responsive to a predetermined phase-relation between the zero-sequence line-current component and its own particular phase of the negative-sequence line-current component, phase-fault relaying-means for responding sensitively to at least one of the two faulted line-conductors in the event of a predetermined fault involving two line-conductors of the line and for selecting a predetermined one of said two faulted line-conductors, means responsive to a selective operation of a phase-fault relaying-means for causing a circuit-making operation in the trip-circuit of only the single-pole circuit-interrupter in the phase selected by the phase-fault relaying-means, and means for causing a circuit-making operation in the trip-circuit of only the single-pole circuit-interrupter in the line-conductor selected by the phase-selector elements in joint response to a response of an operating phase-selector element, a non-response of the phase-selector element of the next leading phase, and a non-response of the sensitive phase-fault relaying-means for the unfaulted line-conductor.

SHIRLEY L. GOLDSBOROUGH.

REFERENCES CITED

The following references are of record in the file of this patent:

UNITED STATES PATENTS

| Number | Name | Date |
|---|---|---|
| 2,320,861 | Goldsborough | June 1, 1943 |
| 2,345,590 | Evans et al. | Apr. 4, 1944 |
| 2,430,871 | Goldsborough et al. | Nov. 18, 1947 |